March 11, 1952     M. P. SIEGER     2,588,581
METHOD OF AND APPARATUS FOR SHEARING STRIP MATERIAL
Filed Feb. 12, 1949
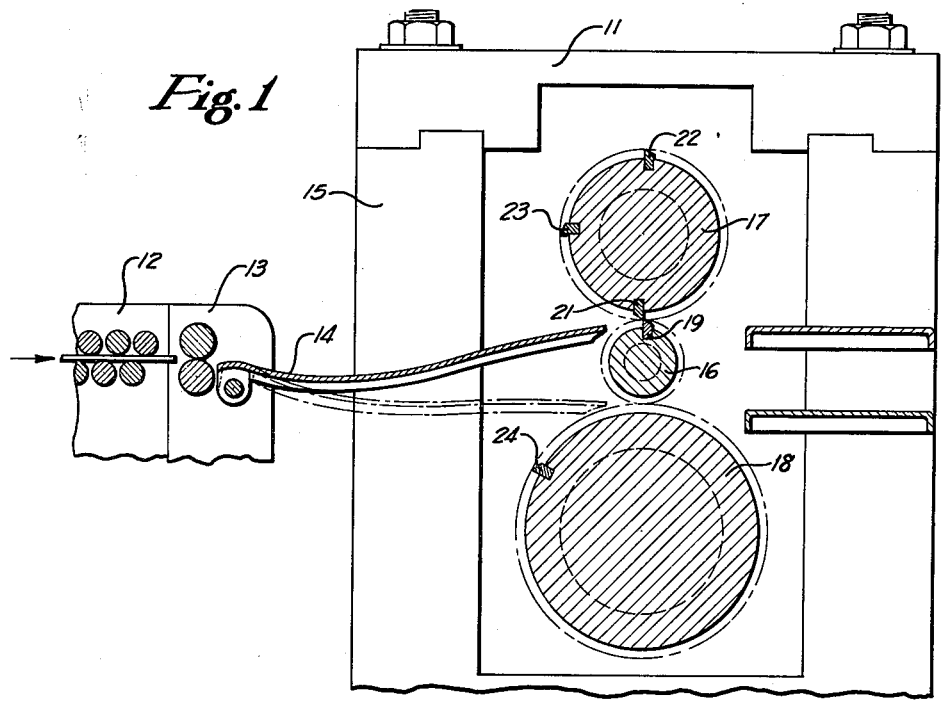
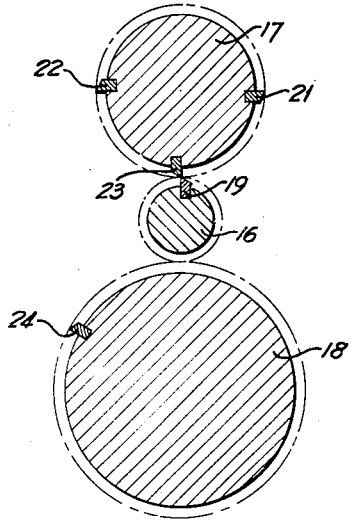
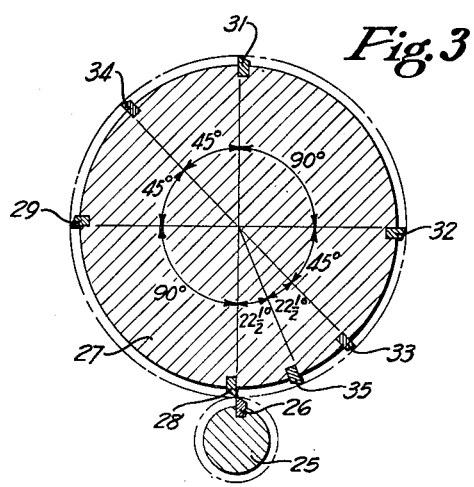
INVENTOR.
MAURICE P. SIEGER
BY Joseph E. Dickinson
his Atty.

Patented Mar. 11, 1952

2,588,581

UNITED STATES PATENT OFFICE 2,588,581

METHOD OF AND APPARATUS FOR SHEARING STRIP MATERIAL

Maurice P. Sieger, Pittsburgh, Pa., assignor to United Engineering & Foundry Company, Pittsburgh, Pa., a corporation of Pennsylvania Application February 12, 1949, Serial No. 76,126

8 Claims. (164—66)

This invention relates to a method of and apparatus for shearing continuous metal strip into varying lengths, having particular reference to the arrangement of the cutting elements of a rotary or drum type flying shear.

In shearing apparatus of the type with which this invention is adapted to be employed, the cutting elements are firmly secured to the drum surfaces thereof and do not lend themselves readily to adjustment for changing the lengths into which strip material may be cut. Usually, in order to vary the length of material passing through the shear before a cut is made, it is necessary either to remove from or to add to the drums additional cutting elements or to vary the speed of either the drums themselves or of the strip material passing therebetween. Although experience has taught that the strip will withstand one hundred per cent overspeed of the knives without being unduly torn and that it will free itself from the knives when they are traveling at approximately twelve and one half per cent underspeed, mere speed adjustment of the knives or of the strip within this range to obtain variations in lengths cut results in a very limited and unsatisfactory arrangement.

The invention herein disclosed contemplates incorporating into a drum type flying shear a common or singular drum or other rotating member, by which a single cutting element is carried, and one or more additional rotatable members or drums each of which may have a plurality of cutting elements supported by and spaced in a pre-determined manner around the surface thereof. The cutting elements, considered in sets and depending upon which set has been selected by proper adjustment of the drum will, for each complete revolution, cooperate with the cutting element of the singular drum to effect cutting of the strip material into the required lengths.

With the foregoing in mind, one of the objects of this invention is to provide a rotary flying shear having a plurality of rotating members upon which are carried cutting elements adapted selectively to be brought into cooperative cutting relationship.

Another object of this invention is to provide a rotary flying shear having a plurality of independent sets of cutting elements carried by at least one of the rotating members thereof which sets may be brought selectively into cooperative cutting relationship with a cutting element secured to a second rotating member.

Still another object of this invention is to provide a rotary flying shear adapted to provide a wide range of lengths into which strip passing therethrough is to be cut without necessitating the removal from or the addition of cutting elements to the rotary members.

A further object of this invention is to provide a rotary flying shear which is simple of construction and accurate of adjustment and control requiring merely the shifting of one of the cutting element carrying drums with respect to the other with which it cooperates for changing the lengths of cut desired.

Still a further object of this invention is to provide a method of shearing continuous strip material into selected lengths simply by modifying the angular relationship between the cutting element supporting members of a rotary flying shear.

These objects, as well as the various other novel features and advantages of this invention, will become apparent from the following description and accompanying drawings of which:

Figure 1 is a schematic view of the preferred arrangement of the cutting elements and the rotating members upon which they are carried;

Figure 2 is a view similar to Figure 1 but showing the upper drum adjusted to bring a different group of cutting elements into cooperative cutting relationship with that secured to a central rotating member, and Figure 3 is a schematic view of a modified form of the invention herein disclosed.

With reference to the drawings Figures 1 and 2 there is shown in combination with a drum type shear 11, a leveler 12 for feeding strip material into a pinch roll unit 13 adjacent thereto, and an adjustable guide 14 pivotally secured to the frame of the pinch roll unit.

The flying shear 11 is provided with a frame 15 within which are rotatably supported a central drum 16, an upper drum 17 of twice the diameter of drum 16 and a lower drum 18 which is three times the diameter of the central one. The drums, being geared together, are adapted to be adjusted angularly with respect to one another for changing the relationship of the cutting elements of the two outer drums with respect to the cutting element 19 of the drum 16. The adjustment may be accomplished in a number of ways, such as, for example, by shifting the gears out of their engaged position and rotating the drums relative to one another into their pre-selected cutting relationship, and the gears re-engaged or by providing clutches for the two outer drums so that on dis-engagement thereof the drums may be rotated independently of the central drum, the selected cutting elements placed in cutting relationship with the element of the central drum and the clutches re-engaged. The drum which is not employed in a particular cutting operation preferably is pre-positioned in its most out of phase relationship with the cutting element of the central drum in order to prevent fouling thereof. Since both the gearing and the driving motor therefor are well known in the art, it is considered to be unnecessary specifically to set forth the details thereof.

The central drum 16 is provided with a cutting element 19 firmly secured to the periphery thereof. The upper drum 17, has attached thereto at the periphery thereof a plurality of similar cutting elements 21, 22 and 23 which are so arranged that when element 21 is in the cutting position relative to element 19, then element 22 also will make a cut on complete revolution of the drum 17, and element 23, being out of phase with respect to element 19, misses a cut. In a similar manner, when the drums 16 and 17 have been adjusted to bring element 23 into the cutting position, then both of the elements 21 and 22 will miss cuts on rotation thereof. When the elements 21 and 22 are in cutting position, the pieces cut from the strip may be varied from lengths equal to the circumference of the circle defined by the cutting element 19 at normal speed, down to lengths equal to one half the circumference of the same circle at one hundred per cent over speed. When the element 23 is in cutting position then the range will be from lengths equal to twice the circumference of the circle of cutting element 19 at normal speed, down to a length equal to the circumference of the same circle when the drums are being rotated at one hundred per cent over speed.

The lower drum 18, being three times the diameter of drum 16, carries a single cutting element 24. On adjustment of the guide 14 and the drums 16 and 18 to bring the elements 19 and 24 into cutting relationship, the pieces which can be cut from the strip passing through the shear may be varied from lengths equal to three times the circumference of the circle defined by element 19 at normal speed, down to lengths equal to one and one half times the circumference of the same circle when the drums are rotated at one hundred per cent over speed. Thus, in the instant case, the range of lengths obtainable is one to six. Of course, when the elements 19 and 24 are to cut material, it is necessary to reverse the driving motors. Although certain specific drum diameter ratios have been recited, there is no intention thereby to limit the invention for it is to be appreciated that, depending upon the use for which this invention is to be employed, various drum diameter ratios such as four to one or higher may be employed.

A modification of my invention comprises a small diameter drum 25 to which is secured a cutting element 26, and a drum 27, of four times the diameter of the first, having secured thereto a plurality of cutting elements 28, 29, 31, 32, 33, 34 and 35 spaced as shown on Figure 3. On one setting of the drums, cutting elements 28, 29, 31 and 32 are in cutting relationship with element 26, on a second setting thereof elements 33 and 34 are in cutting relationship with element 26, and on a third setting cutting element 35 alone will cooperate with element 26. In order to prevent interference with and/or scoring of the strip material which is passing through the shear, for most efficient spacing the elements 28, 29, 31 and 32 making up the first set are located 90° apart, elements 33 and 34 constituting the second set located at diametrically opposite points with element 33 being 45° away from element 28, and the remaining or single cutting element 35 located 22½° away from the element 28. It is evident that by proper angular as well as speed adjustment of the drums the range of lengths obtainable is one to eight.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. In a flying shear, a rotary carrier to which is secured a cutting element, a second rotary carrier to which is secured a plurality of sets of cutting elements, the elements of each of said sets being so spaced circularly around said carrier to define a cutting cycle different from that of any other set, the ratio of the radii of the circles defined by said cutting elements being expressible as a whole number greater than one, said carriers being angularly adjustable with respect to each other whereby a pre-selected set of cutting elements of said second carrier may be brought into cooperative cutting relationship with said first mentioned carrier on each complete revolution of said second rotary carrier.

2. In a rotary flying shear a plurality of carriers to which is secured a plurality of sets of cutting elements, the elements of each of said sets being so spaced circularly around said carrier to define a cutting cycle different from that of any other set, a common carrier to which is secured a single cutting element, the ratio of the radii of the circles defined by said cutting elements being expressible as a whole number greater than one, said carriers being angularly adjustable with respect to each other whereby a pre-selected set of cutting elements of a particular carrier will be brought into cooperative relationship with said single cutting element on each complete revolution of the carrier supporting said pre-selected number of cutting elements.

3. In a flying shear, a rotary member, a cutting element secured to said member, a second rotary member, and a plurality of sets of cutting elements secured to said second member, the elements of each of said sets being so spaced circularly around said carrier to define a cutting cycle different from that of any other set, one of said members adapted angularly to be adjusted with respect to the other for bringing into cooperative cutting relationship said first mentioned cutting element with a pre-selected set of cutting elements supported by said second member.

4. The method of shearing into selected lengths continuous strip material passing through a rotary shear having a plurality of rotary members, the ratio of the radii of any two of which come into cooperative cutting relationship being expressible as a whole number greater than one, to which is secured a plurality of sets of cutting elements, the elements of each of said sets being so spaced circularly around said carrier to define a cutting cycle different from that of any other set, comprising modifying the angular relationship between said rotary members whereby a pre-selected set of cutting elements may be brought into cooperative cutting relationship.

5. In a rotary flying shear for cutting into shorter lengths strip material passing therethrough, a drum to which is secured a cutting element, a second drum to which is secured a plurality of sets of cutting elements, the elements of each of said sets being so spaced around the periphery of said drum to define a cutting cycle different from that of any other set, the ratio of the radius of the circle defined by said first cutting element with respect to the radius of the circle defined by said second mentioned cutting elements being expressible as a whole number greater than one, said drums being angularly adjustable with respect to each other whereby a pre-selected set of cutting elements of said second mentioned drum will be brought into cooperative cutting relationship with said first mentioned cutting element on each complete revolution of said second drum, and means for directing said strip between said drums.

6. In a rotary flying shear for cutting into shorter lengths strip material passing therethrough, a rotary carrier to which is secured a cutting element, a second rotary carrier to which is secured a plurality of sets of cutting elements, the elements of each of said sets being so spaced circularly around said carrier to define a cutting cycle different from that of any other set, the ratio of the radius of the circle defined by said first cutting element with respect to the radius of the circle defined by said second mentioned cutting elements being expressible as a whole number greater than one, said carriers being angularly adjustable with respect to each other whereby a pre-selected set of cutting elements of said second mentioned carrier will be brought into cooperative cutting relationship with said first mentioned cutting element on each complete revolution of said second carrier, and means for feeding said strip into said shear.

7. In a rotary flying shear for cutting into shorter lengths strip material passing therethrough, a plurality of carriers to which is secured a plurality of cutting elements, a common carrier to which is secured a single cutting element, the ratio of the radius of the circle defined by said cutting element of said common carrier with respect to the radii of the circles defined by the cutting elements of any of the other of said carriers being expressible as a whole number greater than one, said carriers being angularly adjustable with respect to each other whereby pre-selected cutting elements of a particular carrier will be brought into cooperative relationship with said single cutting element on each complete revolution of the carrier supporting said pre-selected cutting elements and guide means for directing said strip between said cooperating cutting elements.

8. In a rotary flying shear for cutting into shorter lengths strip material passing therethrough, a carrier to which is secured a single cutting element, a second carrier to which are secured seven cutting elements, the ratio of the radius of the circle defined by said single cutting element with respect to the radius of the circle defined by said second mentioned cutting elements being expressible as a whole number greater than one, said elements being arranged on said second mentioned carrier so that four elements constituting one set are spaced substantially 90° apart, two elements constituting a second set spaced substantially 180° apart and substantially 45° away from the most adjacent element of said first mentioned set, and the remaining element spaced substantially 22½° away from the most adjacent of any of the aforementioned cutting elements, said carriers being angularly adjustable with respect to each other whereby pre-selected cutting elements of said second mentioned carrier will be brought into cooperative cutting relationship with said first mentioned cutting element on each complete revolution of said second carrier.

MAURICE P. SIEGER.

REFERENCES CITED

The following references are of record in the file of this patent:

UNITED STATES PATENTS

| Number | Name | Date |
| --- | --- | --- |
| 1,039,124 | Harbrecht | Sept. 24, 1912 |
| 2,121,145 | Fisk | June 21, 1938 |
| 2,258,816 | Shields | Oct. 14, 1941 |
| 2,415,428 | Iversen | Feb. 11, 1947 |

FOREIGN PATENTS

| Number | Country | Date |
| --- | --- | --- |
| 569,052 | Germany | Jan. 27, 1933 |